(12) United States Patent
Makley et al.

(10) Patent No.: US 9,330,730 B2
(45) Date of Patent: May 3, 2016

(54) DRIVE TRAY

(75) Inventors: Albert V. Makley, Morrisville, NC (US);
William F. Martin-Otto, Apex, NC (US); Marc R. Pamley, Durham, NC (US); Timothy S. Farrow, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1499 days.

(21) Appl. No.: 12/729,430

(22) Filed: Mar. 23, 2010

(65) Prior Publication Data

US 2011/0234064 A1 Sep. 29, 2011

(51) Int. Cl.
*H05K 5/00* (2006.01)
*G11B 33/12* (2006.01)
*G06F 1/18* (2006.01)
*G11B 33/08* (2006.01)
*G11B 33/14* (2006.01)

(52) U.S. Cl.
CPC .............. *G11B 33/128* (2013.01); *G06F 1/187* (2013.01); *G11B 33/08* (2013.01); *G11B 33/124* (2013.01); *G11B 33/142* (2013.01)

(58) Field of Classification Search
CPC ........................... G11B 33/124; G11B 33/128
USPC .......................... 454/184; 361/679.33, 679.37
See application file for complete search history.

(56) References Cited

U.S. PATENT DOCUMENTS

| | | | |
|---|---|---|---|
| 5,921,644 A * | 7/1999 | Brunel et al. | 312/223.2 |
| 6,067,225 A * | 5/2000 | Reznikov et al. | 361/679.31 |
| 6,166,900 A * | 12/2000 | Flynn et al. | 361/679.35 |
| 6,227,630 B1 * | 5/2001 | Brown et al. | 312/223.2 |
| 6,231,224 B1 * | 5/2001 | Gamble et al. | 362/551 |
| 6,233,143 B1 * | 5/2001 | Gamble et al. | 361/679.34 |
| 6,259,599 B1 * | 7/2001 | Gamble et al. | 361/679.34 |
| 6,385,036 B1 * | 5/2002 | Chien | 361/679.58 |
| 6,719,385 B1 * | 4/2004 | Adams et al. | 312/334.1 |
| 6,850,410 B2 * | 2/2005 | Peeke et al. | 361/679.32 |
| 6,906,918 B2 * | 6/2005 | Rabinovitz | 361/679.48 |
| 6,918,174 B2 * | 7/2005 | Kim et al. | 29/603.04 |
| 7,054,150 B2 * | 5/2006 | Orriss et al. | 361/679.33 |
| 7,072,177 B2 * | 7/2006 | Peng et al. | 361/679.33 |
| 7,079,381 B2 * | 7/2006 | Brehm et al. | 361/679.33 |
| 7,088,579 B1 * | 8/2006 | Konshak | 361/679.32 |
| 7,092,250 B2 * | 8/2006 | Chen et al. | 361/679.35 |
| 7,251,099 B2 * | 7/2007 | Kao et al. | 361/679.33 |
| 7,271,999 B2 * | 9/2007 | Rabinovitz | 361/679.33 |
| 7,312,999 B1 * | 12/2007 | Miyamura et al. | 361/724 |

(Continued)

OTHER PUBLICATIONS

CoolerMaster (http://www.hardwarecanucks.com/forum/hardware-canucks-reviews/11304-cooler-master-haf-932-case-review-10.html, Nov. 6, 2008, retrieved Mar. 19, 2015).*

(Continued)

*Primary Examiner* — Steven B McAllister
*Assistant Examiner* — Jonathan Cotov
(74) *Attorney, Agent, or Firm* — Brian J. Pangrle

(57) ABSTRACT

An exemplary drive tray includes parallel side members; at least one end member connected to the parallel side members where the members collectively form a resilient, substantially rectangular frame for receipt of a drive body; and a pair of parallel side walls extending in a direction normal to a plane defined by the frame where the pair of parallel side walls include engagement features to engage opposing sides of a drive body. Various other apparatuses, systems, methods, etc., are also disclosed.

18 Claims, 7 Drawing Sheets

(56) References Cited

U.S. PATENT DOCUMENTS

| | | | |
|---|---|---|---|
| 7,319,586 B2* | 1/2008 | Hall et al. | 361/679.33 |
| 7,324,349 B2* | 1/2008 | Wobig et al. | 361/756 |
| 7,379,294 B2* | 5/2008 | Chen | 361/679.33 |
| 7,457,110 B2* | 11/2008 | Lo et al. | 361/679.33 |
| 7,483,268 B1* | 1/2009 | King et al. | 361/679.38 |
| 7,492,586 B2* | 2/2009 | Peng et al. | 361/679.33 |
| 7,495,904 B2* | 2/2009 | Liang et al. | 361/679.39 |
| 7,542,295 B2* | 6/2009 | Imsand | 361/726 |
| 7,570,484 B1* | 8/2009 | Sivertsen | 361/679.37 |
| 7,609,511 B2* | 10/2009 | Peng et al. | 361/679.37 |
| 7,626,812 B2* | 12/2009 | Chang et al. | 361/679.33 |
| 7,639,492 B2* | 12/2009 | Thomas et al. | 361/679.37 |
| 7,679,896 B2* | 3/2010 | Deng et al. | 361/679.33 |
| 7,697,276 B2* | 4/2010 | Peng et al. | 361/679.33 |
| 7,697,278 B2* | 4/2010 | Peng et al. | 361/679.35 |
| 7,729,110 B2* | 6/2010 | Zhang et al. | 361/679.33 |
| 7,835,148 B2* | 11/2010 | Tu | 361/679.39 |
| 7,864,522 B1* | 1/2011 | Peng et al. | 361/679.33 |
| 7,950,752 B2* | 5/2011 | Lin | 312/333 |
| 7,974,088 B2* | 7/2011 | Li | 361/679.37 |
| 7,995,337 B2* | 8/2011 | Kuo | 361/679.34 |
| 8,159,817 B2* | 4/2012 | Lin et al. | 361/679.39 |
| 8,218,315 B2* | 7/2012 | Lu | 361/679.58 |
| 8,226,050 B2* | 7/2012 | Ye et al. | 248/27.3 |
| 8,264,833 B2* | 9/2012 | Fang et al. | 361/679.34 |
| 8,405,971 B2* | 3/2013 | Merrow et al. | 361/679.34 |
| 8,456,832 B1* | 6/2013 | Brigham et al. | 361/679.35 |
| 8,544,801 B2* | 10/2013 | Ting | 248/27.3 |
| 2002/0101713 A1* | 8/2002 | Eland | 361/686 |
| 2002/0199048 A1* | 12/2002 | Rabinovitz | 710/100 |
| 2004/0022034 A1* | 2/2004 | Coles et al. | 361/726 |
| 2004/0095716 A1* | 5/2004 | McAlister | 361/685 |
| 2004/0100761 A1* | 5/2004 | Liu | 361/685 |
| 2004/0264121 A1* | 12/2004 | Orriss et al. | 361/685 |
| 2005/0024819 A1* | 2/2005 | Peng et al. | 361/685 |
| 2005/0174730 A1* | 8/2005 | Chen et al. | 361/685 |
| 2006/0023413 A1* | 2/2006 | Lo et al. | 361/684 |
| 2006/0268509 A1* | 11/2006 | Marroquin et al. | 361/687 |
| 2007/0053154 A1* | 3/2007 | Fukuda et al. | 361/687 |
| 2007/0127202 A1* | 6/2007 | Scicluna et al. | 361/685 |
| 2007/0159786 A1* | 7/2007 | Liu et al. | 361/685 |
| 2007/0217143 A1* | 9/2007 | Wagatsuma et al. | 361/685 |
| 2007/0230107 A1* | 10/2007 | Hsu et al. | 361/685 |
| 2008/0060363 A1* | 3/2008 | Crippen et al. | 62/3.2 |
| 2008/0080130 A1* | 4/2008 | Chen | 361/685 |
| 2008/0128579 A1* | 6/2008 | Chen et al. | 248/694 |
| 2008/0158810 A1* | 7/2008 | Liu et al. | 361/685 |
| 2008/0204994 A1* | 8/2008 | Wang | 361/685 |
| 2008/0259554 A1* | 10/2008 | Qin et al. | 361/685 |
| 2009/0091884 A1* | 4/2009 | Walker et al. | 361/679.37 |
| 2009/0296338 A1* | 12/2009 | Peng et al. | 361/679.31 |
| 2010/0200523 A1* | 8/2010 | Henderson | 211/26 |
| 2010/0321879 A1* | 12/2010 | Peng et al. | 361/679.33 |
| 2011/0188195 A1* | 8/2011 | Scherf-Smith et al. | 361/679.37 |
| 2011/0234064 A1* | 9/2011 | Makley et al. | 312/236 |

OTHER PUBLICATIONS

SilverStone (http://hardwarecanucks.com/forum/hardware-canucks-reviews/12201-silverstone-fortress-ft01-mid-tower-casereview-8.html, Dec. 1, 2008, retrieved Mar. 23, 2015).*

* cited by examiner $$\Delta Q/\Delta t = h_{plate}A(T_{plate} - T_{in})$$

Exemplary Method 700

710

Providing a housing that includes adjacent drive bays, each drive bay holding a rectangular drive body disposed intermediate a top side and a bottom side in a resilient, substantially rectangular frame of a slidably removable drive tray.

720

Electrically or electrically and mechanically operating one or more components housed in at least one of the drive bodies.

730

Drawing air into the housing where the air flows in channels defined by and between adjacent drive bodies, the channels unimpeded by the drive trays to enhance removal of heat from the drive bodies.

FIG. 7

DRIVE TRAY

TECHNICAL FIELD

Subject matter disclosed herein generally relates to drive trays and heat transfer.

BACKGROUND

A conventional computer is an assembly of parts or components. For example, a conventional computer typically includes a variety of components installed in a housing (e.g., a frame, a case, etc.). Such components may include a motherboard, memory and one or more media drives. Often, a media drive is seated in a drive tray where the drive and tray assembly can be readily inserted into, or removed from, a housing. As described herein, various exemplary drive tray features can enhance heat transfer between a fluid (e.g., air) and a media drive.

SUMMARY

An exemplary drive tray includes parallel side members; at least one end member connected to the parallel side members where the members collectively form a resilient, substantially rectangular frame for receipt of a drive body; and a pair of parallel side walls extending in a direction normal to a plane defined by the frame where the pair of parallel side walls include engagement features to engage opposing sides of a drive body. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

FIG. 7 is a diagram of an exemplary method for transferring heat from one or more drives to a fluid.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
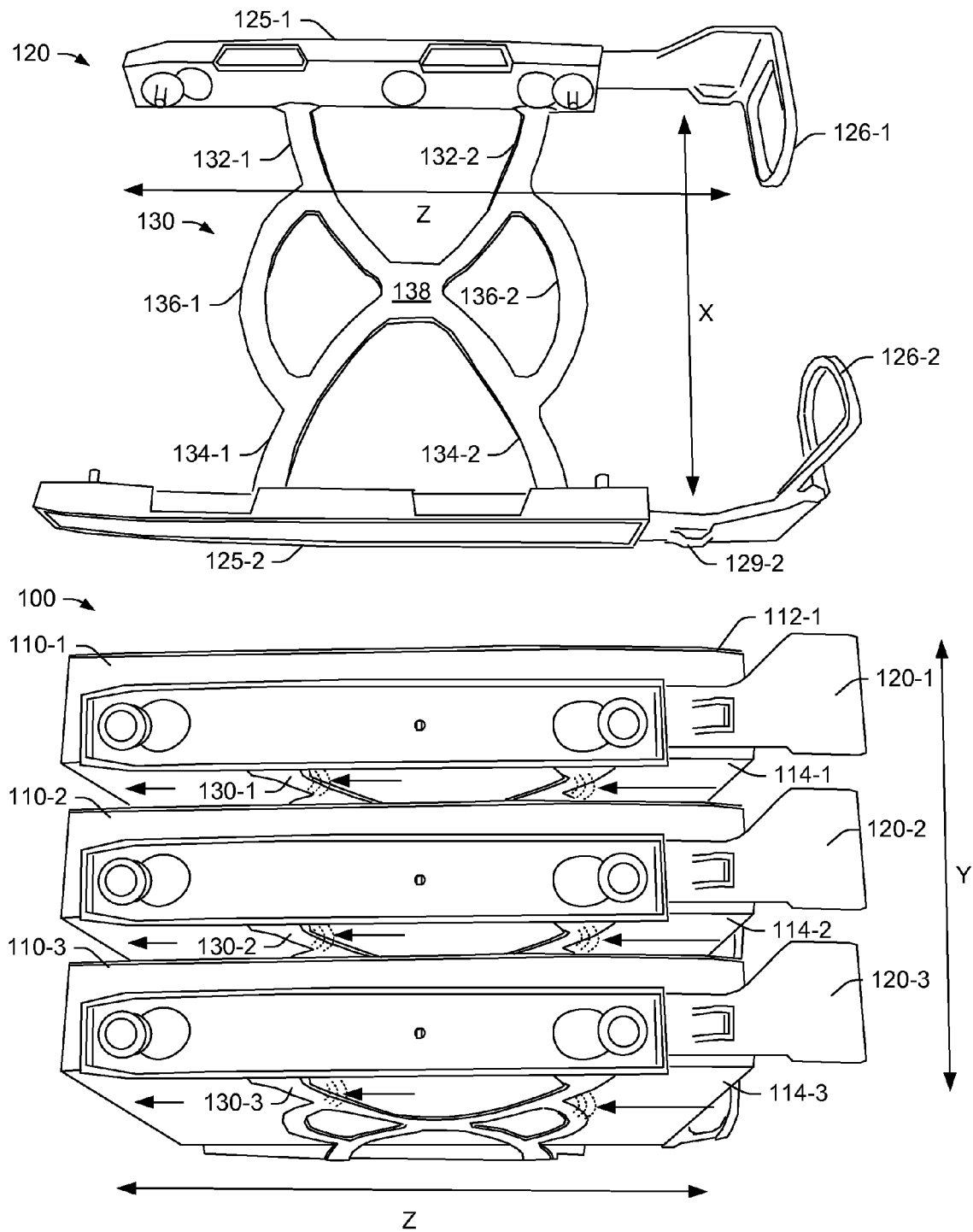
FIG. 1 is a perspective view of a conventional drive tray and a perspective view of a conventional stack of drive tray and drive assemblies.

FIG. 1 shows a conventional drive tray 120 that has two side walls 125-1 and 125-2 that extend in a direction normal (Y direction) to a plane defined by a planar bridge 130 (XZ plane). As shown, the bridge 130 has a thickness or thicknesses (Y direction) defined by side wall extensions 132-1, 132-2, 134-1 and 134-2, which meet at a central square 138, and a pair of braces 136-1 and 136-2 that support the extensions 132-1 and 134-1 and the extensions 132-2 and 134-2, respectively. Other features include finger grips 126-1 and 126-2 as well as side wall tabs 129-1 and 129-2.

FIG. 1 also shows a conventional stack 100 of drive tray and drive assemblies formed by drive bodies 110-1, 110-2 and 110-3 being seated in trays 120-1, 120-2 and 120-3, respectively. In FIG. 1, the bridges 130-1, 130-2 and 130-3 are positioned adjacent respective bottom sides 114-1, 114-2 and 114-3 of the drive bodies. As shown in FIG. 1, a conventional tray physically mounts to opposing sides of a drive body where a bridge connects two side walls and runs along a surface of the drive. In FIG. 1, with respect to the stack 100, various arrows indicate fluid flow direction across and adjacent to the bottom sides 114-1, 114-2 and 114-3 of the respective drive bodies 110-1, 110-2 and 110-3. As indicated, fluid flow is impeded by each of the respective bridges 130-1, 130-2 and 130-3. Specifically, the four extensions 132-1, 132-2, 134-1 and 134-2, the central square 138 and the pair of braces 136-1 and 136-2 can all impede fluid flow.

Figure 2:
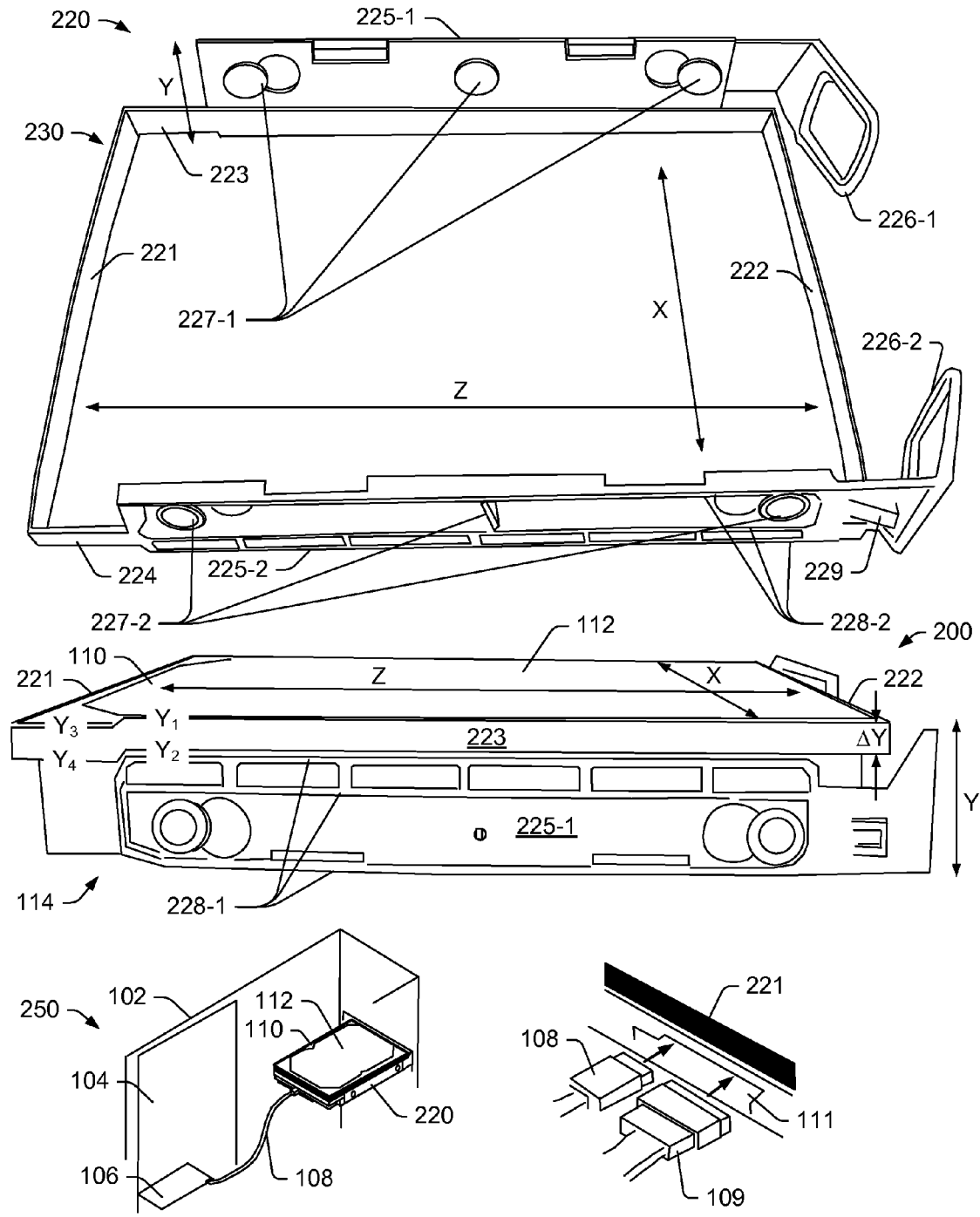
FIG. 2 is a perspective view of an exemplary drive tray, a perspective view of an exemplary drive tray and drive assembly and a perspective view of a housing with an exemplary assembly.

FIG. 2 shows an exemplary tray 220 with and without a drive body 110. Orthogonal directions X, Y and Z are shown, for example, as being associated with widths, heights and lengths of the tray 220 and the drive body 110. In the example of FIG. 2, the tray 220 includes end members 221 and 222 (X direction) and side members 223 and 224 (Z direction), which, collectively, form a substantially rectangular frame 230. Side walls 225-1 and 225-2 extend in a direction substantially normal (Y direction) to a plane defined by the frame 230 (XZ plane).

In the example of FIG. 2, each of the side walls 225-1 and 225-2 includes engagement features such as dampers 227-1 and 227-2. Each damper may be made of a material having damping properties (e.g., rubber or other polymeric, suitable composite material, etc.). For engagement, each damper includes one or more contact points for contacting a side of a drive body. A damper may have a "grippy" surface that provides a sufficient coefficient of friction to engage a side of a drive body where such a surface may be smooth or rough.

In the example of FIG. 2, as mentioned, the drive tray 220 includes the parallel side members 223 and 224 and at least one end member 221 and 222 connected to the side members 223 and 224 to collectively form a resilient, substantially rectangular frame 230 for receipt of a drive body. The pair of parallel side walls 225-1 and 225-2 extend in a direction normal (Y direction) to a plane defined by the frame 230 (XZ plane) and include engagement features 227-1 and 227-2 to engage opposing sides of a drive body (e.g., YZ sides of a drive body).

As described herein, the frame 230 is resilient to allow for receipt of a drive body between the side walls 225-1 and 225-2. For example, the frame 230 is configured to allow the side walls 225-1 and 225-2 to engage opposing sides of a drive body, which allows the dampers 227-1 and 227-2 to damp vibrations that could be transmitted from a housing to the tray 220. Such an arrangement can also damp vibrations that could be transmitted from a drive body to the tray 220.

Accordingly, the frame 230 is not intended to interfere with the ability of engagement features to engage opposing sides of a drive body.

FIG. 2 also shows an exemplary assembly 200 that includes a drive body 110 seated in the exemplary tray 220. The drive body 110 has a top side 112 (e.g., XZ plane at an upper Y dimension) and a bottom side 114 (e.g., XZ plane at a lower Y dimension). In the example of FIG. 2, the frame 230 is positioned intermediate the top side 112 and the bottom side 114 of the drive body 110 (see, e.g., the frame 230 height ΔY, the upper edge of which may be set even with the top side 112). In the example of FIG. 2, to avoid impeding fluid flow across the top side 112 of the drive body 110, the frame 230 does not extend in the Z direction or the X direction over the top side 112.

While an exemplary frame is generally positioned intermediate top and bottom sides of a drive body, a frame may extend a small amount in a direction normal to a top side of a drive body (e.g., along a fluid flow direction that would not have any significant impact on fluid flow across the top side of the drive body).

In the example of FIG. 2, the frame 230 includes a pair of arms near the aft end of the side walls 225-1 and 225-2 (see, e.g., dimensions $Y_1$, $Y_2$, $Y_3$ and $Y_4$ near the end member 221) where $Y_1$ is substantially aligned with a surface of the top side 112 of the drive body 110 and $Y_3$ is substantially aligned with another surface of the top side 112 of the drive body 110. Specifically, various drive bodies may have contoured or multilevel sides. As described herein, an exemplary frame may be configured for alignment with one or more contours or levels of a top side of a drive body.

Additionally, FIG. 2 shows an exemplary assembly 250 that includes a housing 102 that houses a drive body 110 seated in a tray 220. In this example, the drive body 110 includes one or more sockets 111 configured for receipt of one or more connectors 108 and 109. The connector 108 may connect to control circuitry 106, which may be associated with a motherboard 104 (e.g., computer motherboard with a chipset, memory, etc.). As indicated in FIG. 2, the member 221 of the frame 230 (marked in solid black) does not interfere with access to the one or more sockets 111 of the drive body 110. As described with respect to FIG. 3, an exemplary tray may not include an aft end member or may include a truncated aft end member that does not interfere with access to one or more sockets of a drive body (e.g., or optionally other drive features such as jumpers, etc.).

As described herein, an exemplary tray can include tool-less engagement features that capture a drive body and can include features that tool-lessly engage the tray with a bay or housing (see, e.g., features 228-1 and 228-2). Tool-less engagement features allow a user to readily install and remove a drive body from a housing, case, frame, etc.

Figure 3:
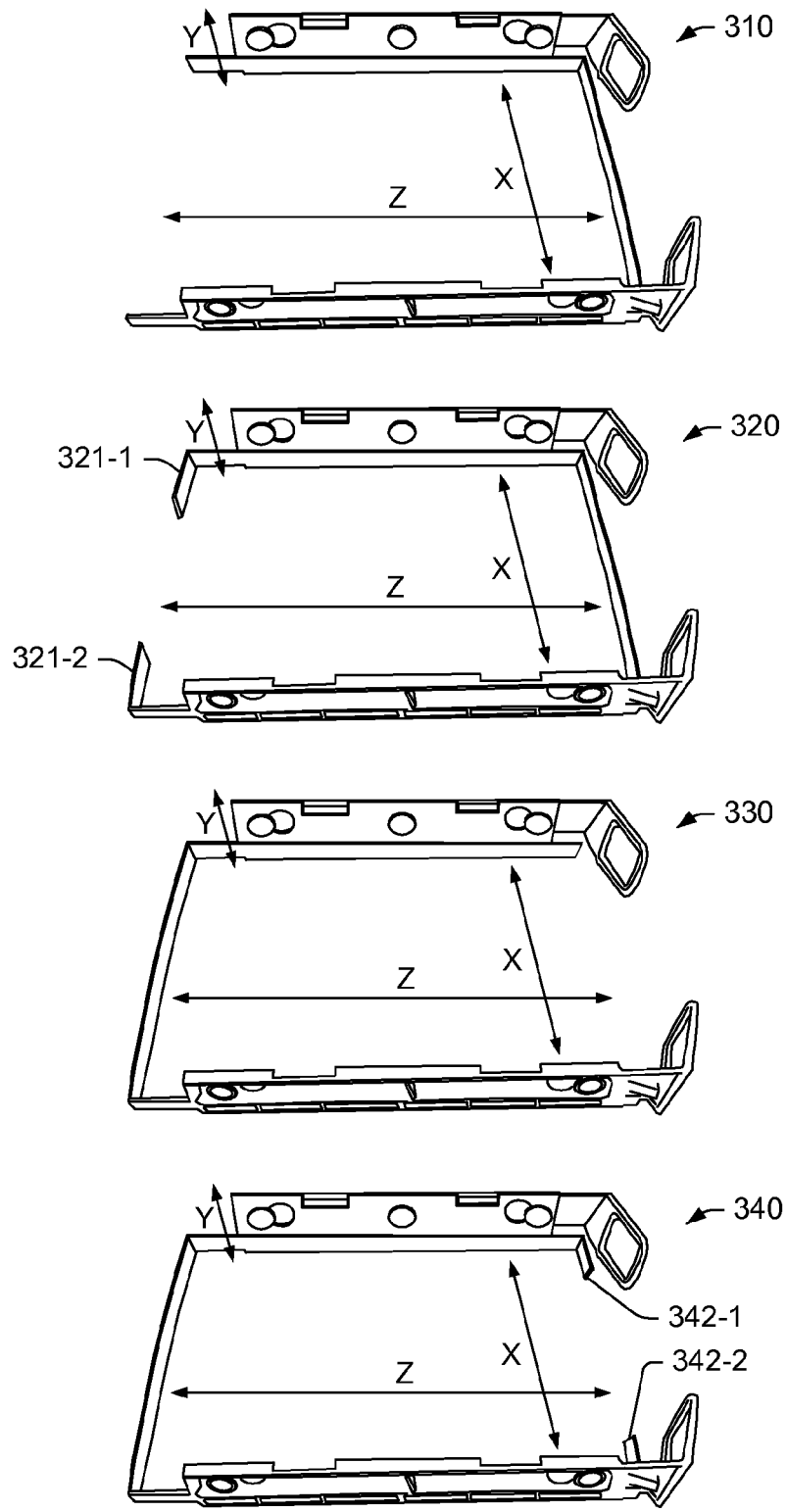
FIG. 3 is a series of perspective views of exemplary drive trays.

FIG. 3 shows various exemplary trays 310, 320, 330 and 340. The tray 310 includes a fore end member but no aft end member to form a U-shaped, or substantially rectangular, frame (e.g., for positioning intermediate a top side and a bottom side of a drive body). The tray 320 includes a substantially rectangular frame formed by at least one truncated aft end member 321-1 and 321-2, which can assist with removal of a drive body and drive tray assembly, for example, to help ensure, upon sliding the assembly out of a bay, that the drive body remains seated in the drive tray. The tray 330 includes an aft end member but no fore end member to form a U-shaped, or substantially rectangular, frame (e.g., for positioning intermediate a top side and a bottom side of a drive body). The tray 340 includes a substantially rectangular frame formed by at least one truncated fore end member 342-1 and 342-2, which can assist with insertion of a drive body and drive tray assembly, for example, to help ensure, upon sliding the assembly into a bay, that the drive body remains seated in the drive tray. In the various examples of FIG. 3, the full end member of a frame (e.g., whether fore or aft) is configured with sufficient rigidity, for example, to allow the engagement features of the side walls to engage a drive body. In the examples 320 and 340 of FIG. 3, while two truncated members are shown, an exemplary tray may include one truncated end member (e.g., of a width in the X direction that is less than the width of an opposing full end member).

Figure 4:
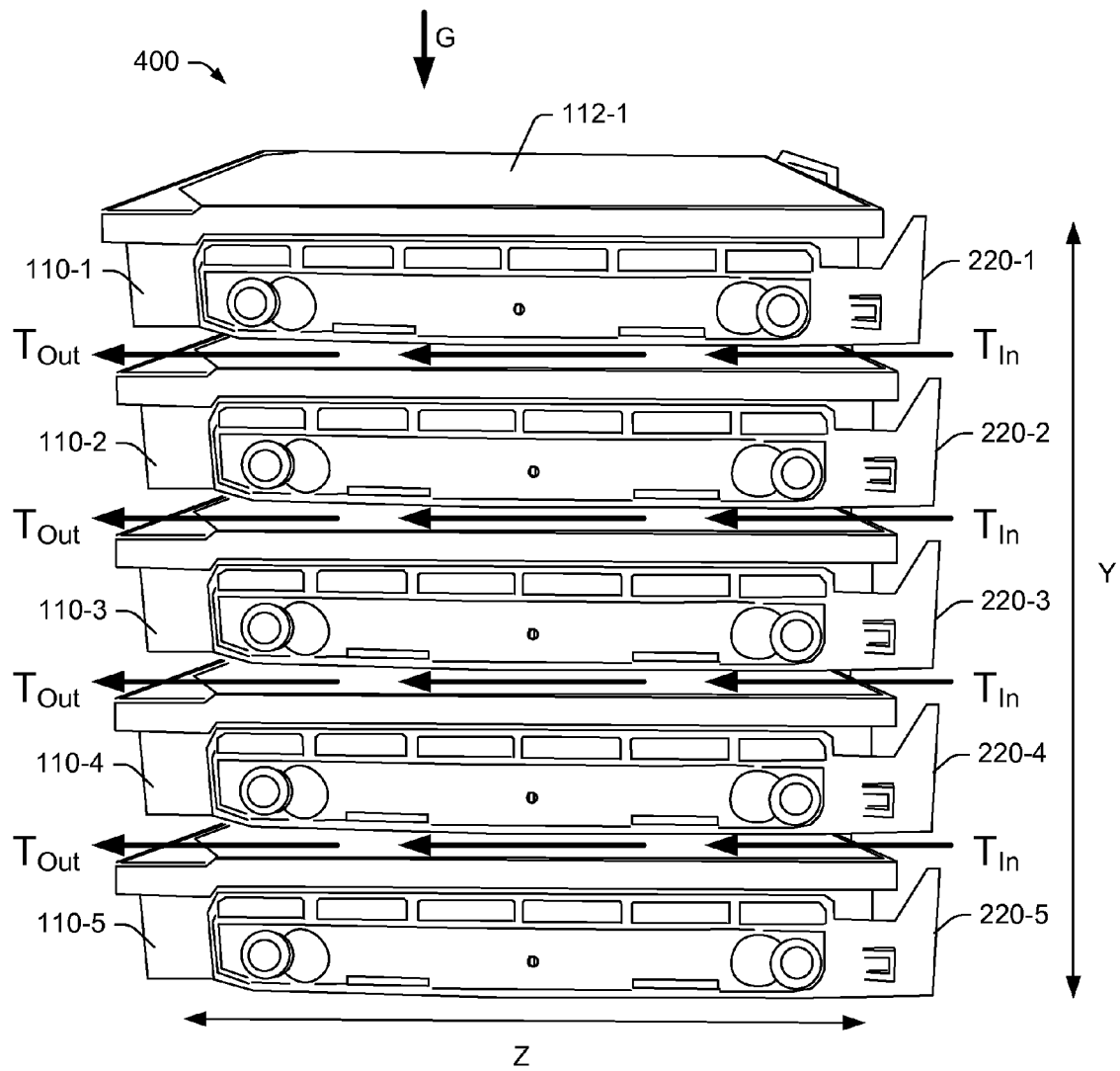
FIG. 4 is a perspective view of an exemplary stack of drive tray and drive assemblies.

FIG. 4 shows an exemplary stack 400 of five drive body and drive tray assemblies: 110-1 and 220-1, 110-2 and 220-2, 110-3 and 220-3, 110-4 and 220-4, and 110-5 and 220-5. In the example of FIG. 4, gaps exist between adjacent assemblies in the Y direction where fluid flow in these gaps is shown as being unimpeded in the Z direction. Referring again to the conventional stack 100 of FIG. 1, fluid flow in the Z direction is impeded by the bridges 130-1, 130-2 and 130-3. Where the drive bodies generate heat, heat transfer to the fluid causes the fluid to rise from an inlet temperature $T_{in}$ to an outlet temperature $T_{out}$. Where the stack 400 is oriented differently with respect to gravity (G), fluid may flow at least in part due to natural convection as heat is transferred from a drive body to a compressible fluid such as air. As described herein, an exemplary tray (e.g., when compared to the conventional tray 120), can enhance natural convection.

Figure 5:
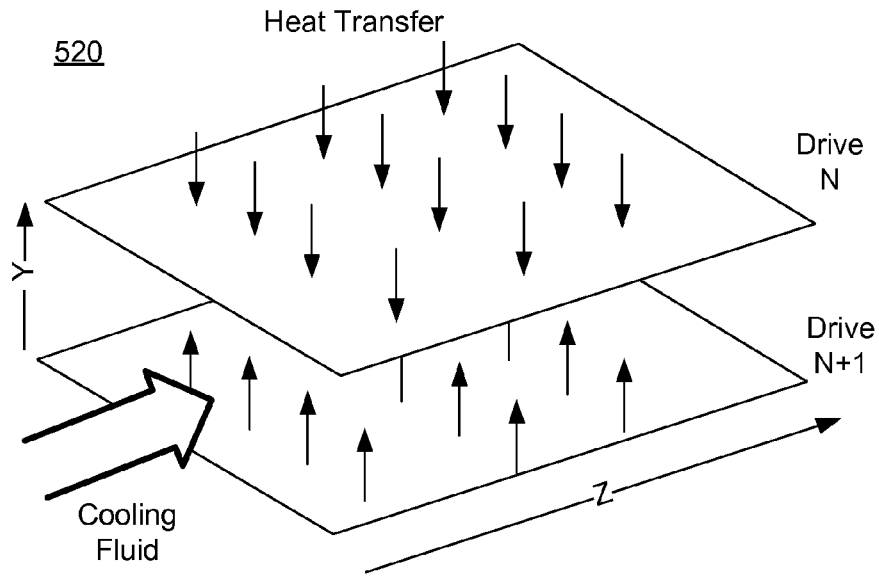
FIG. 5 is a diagram illustrating heat transfer, a heat transfer equation and a plot illustrating velocity with respect to an axial dimension for features of a conventional tray and an exemplary tray.
Figure 5:
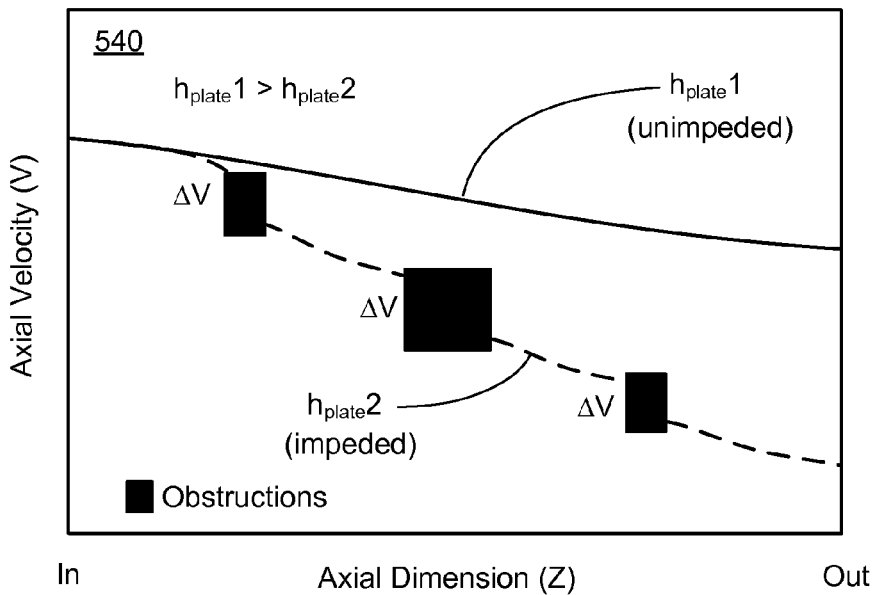

FIG. 5 shows a heat transfer diagram 520, a heat transfer equation 530 and an approximate plot of axial velocity versus axial dimension 540. In the diagram 520, heat is transferred from a drive N and a drive N+1 to cooling fluid flowing in a gap, the fluid flowing predominantly along the Z direction. Such heat transfer may be characterized at least in part by the equation 530: $\Delta Q/\Delta t = h_{plate} A (T_{plate} - T_{in})$. In this equation, the flux of energy ($\Delta Q/\Delta t$) is equal to the heat transfer coefficient for a plate ($h_{plate}$), the area of the plate (A) and the temperature difference between the plate and the cooling fluid ($T_{plate} - T_{in}$). Heat transfer may optionally be characterized by Reynolds number (ratio of inertial forces to viscous forces), Prandtl number (ratio of kinematic viscosity and thermal diffusivity), Nusselt number (ratio of convective to conductive heat transfer across a surface) or Grashof number (ratio of the buoyancy to viscous force acting on a fluid).

The plot 540 shows approximate axial velocities versus axial distance (e.g., Z direction) for fluid flowing adjacent a drive body seated in a conventional tray (see, e.g., FIG. 1) and an exemplary tray (see, e.g., FIG. 2 or FIG. 3). As described herein, an exemplary tray can increase heat transfer coefficient ($h_{plate}1$) compared to a conventional tray ($h_{plate}2$). Heat transfer depends on various factors. Where obstructions to flow exist (solid blocks in the plot 540), flow is impeded, which diminishes momentum and typically velocity (e.g., for constant cross-sectional flow area). Accordingly, an exemplary tray allows for unimpeded flow and enhancement of flux of energy from a drive body to a cooling fluid.

Figure 6:
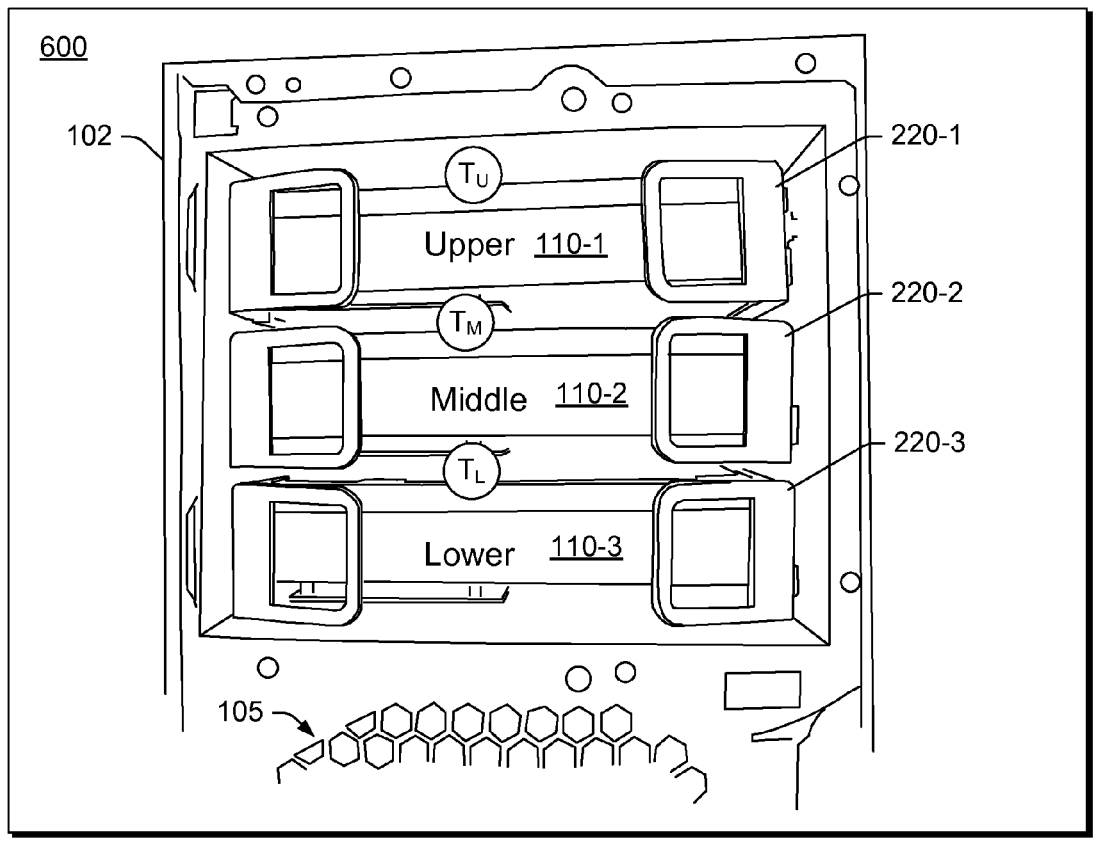
FIG. 6 is a perspective view of an exemplary system that includes a stack of drive tray and drive assemblies and a plot of trial data acquired during operation of the system.
Figure 6:
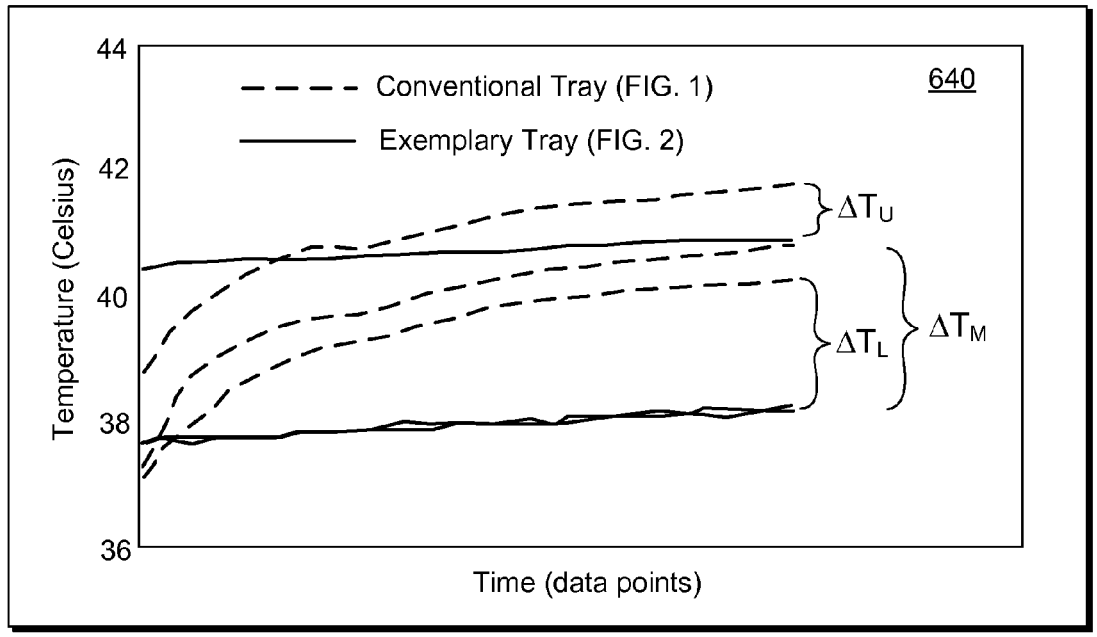

FIG. 6 shows an exemplary system 600 that was used to conduct performance trials for three exemplary drive and tray assemblies 110-1 and 220-1 (upper), 110-2 and 220-2 (middle) and 110-3 and 220-3 (lower) located in a housing 102. The housing 102 included an air mover (e.g., a fan) configured to drive air through openings 105. In the system 600, as air is forced out through the openings 105, pressure inside the housing 102 is reduced, which draws air in via the gaps between and adjacent to the assemblies.

With respect to installation of multiple drives, some manufacturers recommend installing a first drive in a lower position, installing a second drive in an upper position and installing any additional drive in a middle position, as it can reduce adjacent heating (e.g., given three bays, for single and dual HDD configurations a HDD is not directly adjacent to another HDD). In various examples, a drive may be a HDD, a SDD, or other type of media drive.

FIG. 6 also shows a plot 640 of temperatures measured with respect to time for the exemplary system 600 (solid lines) and for a conventional system that relied on conventional trays as shown in FIG. 1 (dashed lines). As indicated in the plot 640, the system 600 with the exemplary trays reduced temperatures in the gaps. In particular, for the middle assembly (drive body 110-2 and tray 220-2), the reduction in temperature was over two degrees Celsius. Accordingly, where a stack includes three or more exemplary drive and drive tray assemblies, middle drives may be expected to have significantly increased heat transfer compared to conventional drive and drive tray assemblies.

Accordingly, a computer manufacturer may choose to alter specifications for an air mover such as a fan based on use of one or more exemplary trays. Such a decision may reduce energy usage of the computer. In another example, a controller may sense temperature and actuate an air mover responsive to an increase in temperature. Where exemplary trays are used, the air mover may reduce the temperature more quickly (compared to conventional tray usage) and allow for shorter actuation periods for the air mover, which, in turn, can reduce energy usage. As indicated in the plot 640, operation of a system may simply act to reduce temperature of one or more drives, which, in turn, may extend the operational lifetime of the one or more drives.

As described herein, an exemplary tray provides an open, unimpeded volumetric space adjacent a side of a drive body. Where three or more drive body and drive tray assemblies are stacked, use of exemplary trays allows open volumetric spaces above and below middle drives as the exemplary trays do not introduce any blockage between the drives.

As described herein, an assembly includes a rectangular drive body that has a top side, a bottom side and four side walls and a drive tray that includes a resilient frame configured for receipt of the drive body intermediate the top side and the bottom side and a pair of parallel side walls with dampers configured to contact two of the four side walls of the drive body and to damp vibrations between the drive tray and the drive body. An assembly may include additional components, for example, the foregoing assembly may include a second rectangular drive body and a second drive tray where the second drive body is received by the second drive trays.

Where an exemplary assembly includes two or more drive bodies seated in respective drive trays, components may be arranged in a stack with an air flow channel between adjacent drive bodies where the air flow channel is unimpeded by the frames of the drive trays.

As described herein, a drive body may be defined by a length and a width where the product of the length and the width approximates a heat transfer surface area for the drive body and where the heat transfer surface defines a boundary of an air flow channel unimpeded by a frame of a drive tray.

An exemplary system may includes a stack formed by one or more drive body and drive tray assemblies and an air mover configured to draw air into one or more air flow channel between adjacent assemblies. Such a system may include a housing to house the stack and the air mover. Further, such a housing may include two or more drive bays configured for receipt of the drive bodies (e.g., as received by the drive trays). An exemplary tray may include rails along parallel side walls that are configured for receipt by a drive bay (e.g., of a housing).

FIG. 7 shows an exemplary method 700 for removing heat from a system that includes one or more drive and drive tray assemblies. In a provision block 710, the method 700 includes providing a housing that includes adjacent drive bays, each drive bay holding a rectangular drive body disposed intermediate a top side and a bottom side in a resilient, substantially rectangular frame of a slidably removable drive tray. In an operation block 720, the method 700 includes electrically or electrically and mechanically operating one or more components housed in at least one of the drive bodies. As such operating generates heat, the method 700 includes a heat removal block 730 that draws air into the housing. As described herein, where the air flows in channels defined by and between adjacent drive bodies and where the channels are unimpeded by the drive trays, removal of heat from the drive bodies is enhanced. As described herein, an exemplary method may draw in air by an air mover such as a fan that expels air from a housing.

As described herein, an exemplary method may include sensing a temperature and drawing air responsive to the sensing, for example, where the sensing senses temperature in at least one air flow channel. With respect to heat transfer, a drive body may be defined by a length and a width where the product of the length and the width approximates a heat transfer surface area for the drive body. For a stack of drive bodies, one or more channels may be defined in part by a heat transfer surface of a respective one of the drive bodies.

Although some exemplary methods, devices, systems, arrangements, etc., have been illustrated in the accompanying Drawings and described in the foregoing Detailed Description, it will be understood that these examples as disclosed are not limiting, but are capable of numerous rearrangements, modifications and substitutions without departing from the spirit set forth and defined by the following claims.

The invention claimed is:

1. An assembly comprising:
   a drive body; and
   a drive tray component that receives the drive body and that comprises
   a resilient, rectangular frame that defines an open x,z-plane therein and that comprises opposing end members connected to opposing side members without a cross-member bridge, the frame dimensioned for receipt of the drive body in a y direction orthogonal to the open x,z-plane from above or below the open x,z-plane, the drive body having a drive body height dimension wherein the resilient, rectangular frame comprises an upper edge, a lower edge and a frame height dimension defined between the upper edge and the lower edge and wherein the frame height dimension is less than the drive body height dimension; and
   a pair of parallel side walls that extend from the opposing side members of the frame wherein each of the parallel side walls comprises at least one engagement feature that engages the drive body and a rail edge.

2. The assembly of claim 1 wherein the engagement features comprise at least one tool-less engagement feature.

3. The assembly of claim 2 wherein the tool-less engagement features comprise dampers configured to damp transmission of vibration energy.

4. An assembly comprising:
   a drive body that comprises an aft side, a fore side, lateral sides, a top side, a bottom side and a drive height dimension defined between the top side and the bottom side;
   a drive tray component that receives the drive body and that comprises a resilient, rectangular frame that defines an open x,z-plane therein and that comprises opposing end members connected opposing side members without a cross-member bridge, the frame dimensioned for receipt of the drive body in a y direction orthogonal to the open x,z-plane from above or below the open x,z-plane wherein the frame comprises an upper edge, a lower edge and a frame height dimension defined between the upper edge and the lower edge wherein the upper edge is positioned proximate to the top side of the drive body and the lower edge is positioned intermediate the top side and the bottom side of the drive body, and a pair of parallel side walls that extend from the opposing side members of the frame wherein each of the parallel side walls comprises at least one engagement feature that engages the drive body and a rail edge.

5. The assembly of claim 4 further comprising a second rectangular drive body and a second drive tray wherein the second drive body is received by the second drive tray.

6. The assembly of claim 5 wherein the drive bodies, as received by the drive trays, are arranged in a stack wherein the stack comprises an air flow channel between adjacent drive bodies, the air flow channel being unimpeded by the frames of the drive trays.

7. The assembly of claim 6 wherein one of the rectangular drive bodies comprises a length and a width wherein the product of the length and the width approximates a heat transfer surface area for the drive body and wherein the heat transfer surface defines a boundary of the air flow channel.

8. The assembly of claim 6 further comprising an air mover configured to draw air into the air flow channel.

9. The assembly of claim 8 further comprising a housing to house the stack and the air mover.

10. The assembly of claim 9 wherein the housing comprises two or more drive bays configured for receipt of the drive bodies, as received by the drive trays.

11. The assembly of claim 4 wherein the drive tray further comprises one or more finger grips.

12. The assembly of claim 4 further comprising a housing that comprises a plurality of drive bays wherein the rail edge of each of the parallel side walls of the drive tray engages the housing to position the drive tray in one of the plurality of drive bays.

13. A method comprising:
providing a housing that comprises adjacent drive bays, each drive bay holding a rectangular drive body disposed intermediate a top side and a bottom side in a resilient, rectangular frame of a slidably removable drive tray wherein the frame defines an open x,z-plane therein and comprises opposing end members connected to opposing side members without a cross-member bridge, the frame dimensioned for receipt of the drive body in a y direction orthogonal to the open x,z-plane from above or below the open x,z-plane wherein the frame comprises an upper edge, a lower edge and a frame height dimension defined between the upper edge and the lower edge wherein the upper edge is positioned proximate to the top side of the drive body and the lower edge is positioned intermediate the top side and the bottom side of the drive body and wherein the slidably removable drive tray comprises a pair of parallel side walls that extend from the opposing side members of the frame wherein each of the parallel side walls comprises at least one engagement feature that engages the drive body and a rail edge; and drawing air into the housing wherein the air flows in channels defined by and between adjacent drive bodies, the channels unimpeded by the drive trays to enhance removal of heat from the drive bodies.

14. The method of claim 13 further comprising sensing a temperature and drawing air responsive to the sensing.

15. The method of claim 14 wherein the sensing comprises sensing temperature in at least one of the air flow channels.

16. The method of claim 13 wherein each drive body comprises a length and a width wherein the product of the length and the width approximates a heat transfer surface area for the drive body.

17. The method of claim 16 wherein each of the channels is defined in part by a heat transfer surface of a respective one of the drive bodies.

18. The method of claim 13 wherein the drawing air comprises expelling air from the housing.

* * * * *